United States Patent
Lynar et al.

(10) Patent No.: US 10,885,445 B2
(45) Date of Patent: Jan. 5, 2021

(54) METHOD AND APPARATUS FOR INTERCOLLABORATION OF COGNITIVE MODELS

(71) Applicant: International Business Machines Corporation, Armonk, NY (US)

(72) Inventors: Timothy Lynar, Kew (AU); Gandhi Slvakumar, Bentleigh (AU); John Wagner, Plainville, CT (US)

(73) Assignee: International Business Machines Corporation, Armonk, NY (US)

(*) Notice: Subject to any disclaimer, the term of this patent is extended or adjusted under 35 U.S.C. 154(b) by 790 days.

(21) Appl. No.: 15/622,502

(22) Filed: Jun. 14, 2017

(65) Prior Publication Data
US 2018/0365572 A1 Dec. 20, 2018

(51) Int. Cl.
*G06N 5/04* (2006.01)
*G06F 16/903* (2019.01)

(52) U.S. Cl.
CPC ......... *G06N 5/04* (2013.01); *G06F 16/90335* (2019.01)

(58) Field of Classification Search
CPC .................................................. G06N 20/00
USPC .................................................... 706/15, 45
See application file for complete search history.

(56) References Cited

U.S. PATENT DOCUMENTS

| 2014/0201126 A1* | 7/2014 | Zadeh | A61B 5/165 706/52 |
| 2017/0006141 A1* | 1/2017 | Bhadra | H04W 84/18 |

\* cited by examiner

*Primary Examiner* — David R Vincent
(74) *Attorney, Agent, or Firm* — Harrington & Smith

(57) ABSTRACT

A first cognitive instance receives information about other cognitive instances and from this compiles a cognitive community map that associates individual ones of the other cognitive instances with specific capabilities of said respective other cognitive instances. The first cognitive instance stores that map in a local memory of the first cognitive instance; and when the first cognitive instance executes a cognitive computing program it checks the cognitive community map for at least one of the specific capabilities relevant for executing that program to address/satisfy a user request that caused the program to execute. In various embodiment these cognitive instances share their respective cognitive capabilities via cognitive capability maps, which may be refreshed in their local memories for example by sending a broadcast message. Thus any given cognitive instance can identify cognitive peers with the capabilities most relevant to assist itself in solving a given problem/request.

14 Claims, 4 Drawing Sheets

101MAP

COGNITIVE COMMUNITY MAP: COMMUNITY MAP OF COGNITIVE INSTANCE 1

| ASPECT | COGNITIVE INSTANCE 2 | COGNITIVE INSTANCE 3 | COGNITIVE INSTANCE n | PRIORITY | WEIGHTAGe |
|---|---|---|---|---|---|
| 202A LEVEL ID | BASIC | EXPERT | THOUGHT LEADER AND ADVISOR | 1 | 20 |
| 202B FORMAT PROCESSING CAPABILITY | ALL FORMATS | PDFs, WORD | ALL FORMATS | 9 | 5 |
| 202C PARAPHRASE DISTANCE | LOW | MEDIUM | HIGH | 10 | 5 |
| 202D CREDENTIALS | NOT CERTIFIED | CERTIFIED | CERTIFIED | 13 | 5 |
| 202E ACCURACY | X | Y | Z | 11 | 5 |
| 202F PRECISION | A | B | C | 12 | 5 |
| 202G SECURITY | DATA IN STORAGE, ACCESS AND IN MOTION | DATA IN MOTION | DATA IN STORAGE, ACCESS AND IN MOTION | 8 | 5 |
| 202H EXPERT FOOT PRINT DOMAINS | CUSTOMER, PRODUCT | CUSTOMER | CUSTOMER, PRODUCT, RESOURCE | 5 | 10 |
| 202I EXPERT FOOT PRINT DOMAIN LEVELS | LEVEL 1 | LEVEL 3 | LEVEL 5 | 4 | 5 |
| 202J COST TO COMPUTING | LOW | MEDIUM | HIGH | 3 | 5 |
| 202K PROXIMITY | NEXT HOP | NEXT HOP | 2 HOPS | 14 | |
| 202L LEGAL AND REGULATORY PROCESSING (EX: SEDENTARY DATA, MOBILE COMPUTE) | FREE MIGRATION | SEDENTARY DATA, MOBILE COMPUTE | FREE MIGRATION | 2 | 20 |
| 202M RESPONSE TIMES | 3 SEC, 90% OF REQUESTS | 3-5 SECS 90% | 2 SECONDS 95% | 6 | 5 |
| 202N AVAILABILITY | 98% | 99% | 99.9% | 7 | 5 |

METHOD AND APPARATUS FOR INTERCOLLABORATION OF COGNITIVE MODELS

TECHNICAL FIELD

The exemplary embodiments of this invention relate generally to cognitive computing, and more specifically to cooperation among different cognitive computing instantiations.

BACKGROUND

Current developments in the field of cognitive computing are trending towards cognitive models that provide computer simulations and mathematical models of human cognition and perception. Such models are aimed to remember the past, interact with humans, continuously learn and refine the responses for future use. Cognitive modeling is a fairly broad field and different algorithmic models can be used to understand how the human brain processes information; to interpret certain behavioral and neuroscientific data such as physical performance, motivation, emotion and perception; to suggest techniques to remediate cognitive defects due to brain injury or developmental disorders; and to find techniques that facilitate learning in normal human cognition. Most challenging are computational cognitive models that seek to mimic human-like intelligence and there is much research recently into artificial intelligence. Various models can be matched with human cognition qualitatively (non-numerical and relative relationships) or quantitatively (numerical and exact).

There is a wide range of tools that cognitive science employs for these wide ranging computational cognitive models, including production systems/sequential rules, neural networks, Bayesian probabilistic models, and even pure mathematical theories. Individual computational cognitive models are premised on certain hypotheses and assumptions and can provide empirical predictions. Any given cognitive model can be embodied in multiple different instantiations, so for example the same Bayesian probabilistic model can be embodied in computing systems at a university for research and at an airline for setting ticket pricing, though over time these models may self-adapt their probabilistic functions such that they are no longer identical.

Models may be single cell, for example one single cell model may characterize the details of neural function by ion flow, membrane depolarization, neurotransmitter release, action potentials, neuromodulatory interactions. Functional cognitive models characterize the operation and interaction of components of the cognitive architecture and emphasize the transformation of representations. Cognitive models at the computational level focus on the input-output behavior of the system and provide a mathematical characterization of cognition and learning.

Research into cognitive modeling has greatly expanded in recent years which has grown a wide variety of cognitive model instances. What is needed in the art, and what embodiments of these teachings resolve, is a way for these different instances of cognitive models to automatically discover one another through a predefined protocol and take conscious decisions before leveraging the services of some other target cognitive model that was discovered. This would enable each cognitive model to exploit one another's knowledge base so as to result in better decisional outputs due to analysis of the problem at hand from different cognitive model instances that may operate using different processes and/or may be predicated on different assumptions.

SUMMARY

In a first aspect thereof the embodiments of this invention provide a method comprising: receiving at a first cognitive instance over an electronic communication network information about other cognitive instances; compiling from the received information a cognitive community map that associates individual ones of the other cognitive instances with specific capabilities of said respective other cognitive instances; storing the cognitive community map in a local memory of the first cognitive instance; and when executing a cognitive computing program at the first cognitive instance, checking the cognitive community map for at least one of the specific capabilities relevant for executing the cognitive computing program.

In yet another aspect thereof the embodiments of this invention provide an apparatus comprising one or more memories comprising computer-readable code, and one or more processors. In this aspect the one or more processors are configured, in response to execution of the computer-readable code, to cause the apparatus to perform actions comprising: a) receive at a first cognitive instance over an electronic communication network information about other cognitive instances; b) compile from the received information a cognitive community map that associates individual ones of the other cognitive instances with specific capabilities of said respective other cognitive instances; c) store the cognitive community map in a local memory of the first cognitive instance; and d) when executing a cognitive computing program at the first cognitive instance, check the cognitive community map for at least one of the specific capabilities relevant for executing the cognitive computing program. In this regard the apparatus may be the first cognitive instance or only certain components thereof.

In another aspect thereof the embodiments of this invention provide a computer program product comprising a computer readable storage medium having program code embodied therewith, the program code executable by a computing system to cause the computing system to perform: receiving at a first cognitive instance over an electronic communication network information about other cognitive instances; compiling from the received information a cognitive community map that associates individual ones of the other cognitive instances with specific capabilities of said respective other cognitive instances; storing the cognitive community map in a local memory of the first cognitive instance; and when executing a cognitive computing program at the first cognitive instance, checking the cognitive community map for at least one of the specific capabilities relevant for executing the cognitive computing program. The computing system may be the first cognitive instance according to the examples below.

These and other aspects are detailed below with particularity.

BRIEF DESCRIPTION OF THE DRAWINGS

FIG. 2 illustrates a cognitive community map stored in the local memory of a given cognitive instance and holding information about cognitive capabilities of the peer cognitive instances as well as priority and weight calculated for those cognitive capabilities, according to an example embodiment of these teachings.

DETAILED DESCRIPTION

Exemplary embodiments of these teachings enable cognitive models to self-discover each other, and to learn the capabilities of other cognitive models through what is termed herein as cognitive capability maps. In an embodiment each cognitive model or instance builds from this capability information a cognitive community map which is periodically refreshed. At run time for a program at a given cognitive instance, the cognitive controller for that instance takes a call to divert to other models depending upon the rules set by the user.

The background section above details that the current research and practical deployment trend is towards cognitive models that interact with humans and in this regard a goal of these cognitive models is to be as natural as possible. But such models today lack any kind of standards-oriented approach to leverage the services of each other. Embodiments of these teachings utilize a map-based approach to resolve this issue.

Figure 1:
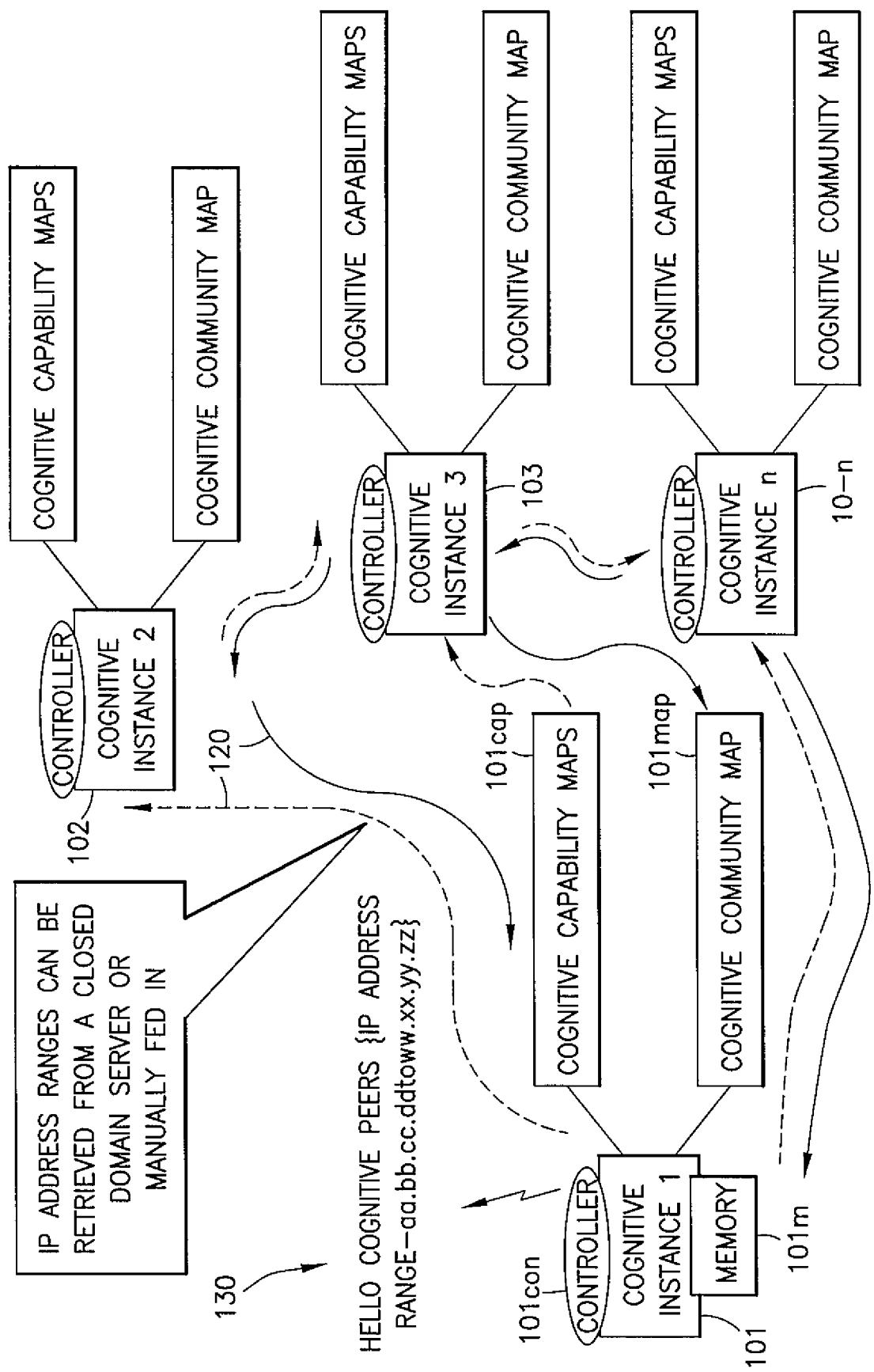
FIG. 1 is a high level schematic diagram illustrating communications and mapping among different instances of cognitive models according to an example embodiment of these teachings.

FIG. 1 is a conceptual diagram illustrating multiple cognitive instances and their communication amongst one another for populating the cognitive community map which is used thereafter by any given one cognitive instance to identify one or more other cognitive instances whose assistance may be appropriate for solving a particular problem. There are multiple cognitive instances $101, 102, 103, 10$-$n$, which are simply different instantiations of cognitive models. The first cognitive instance 101 is described but for the purposes of describing how they interact and how the cognitive community map is built the others are substantially similar.

The first cognitive instance 101 has an associated controller 101con which may be embodied as one or more digital processors that execute the cognitive computing program stored on a computer readable memory 101$m$ that represents the intelligence of cognitive instance 101. The first cognitive instance 101 further has cognitive capability maps 101cap which list the cognitive capabilities of the first cognitive instance 101, and once the cognitive community map 100map is built there are also cognitive capability maps for at least some of the other cognitive instances $102, 103, 10$-$n$. The capability maps of these various cognitive instances $101, 102, 103, 10$-$n$ are used to build the cognitive community map 101map which the first cognitive instance 101 will consult to see if any other cognitive instances $102, 103, 10$-$n$ that are participating according to these teachings has a particular expertise or capability that can aid that first cognitive instance 101 in solving a particular problem when the first cognitive instance 101 is executing its cognitive computing program.

As non-limiting examples, some of the specific cognitive capabilities that each of the cognitive instances includes in its own cognitive capabilities map 101cap include wisdom facet information; expert footprint information; cost to compute information; proximity to the first cognitive instance information; and run-time non-functional requirements. Non-limiting examples of sub-capabilities within the wisdom facet information may include: level identifier, format processing ability, paraphrase distance, accuracy credentials, precision credentials and security credentials. Non-limiting examples of sub-capabilities under the run-time non-functional requirements may include: static run-time requirements, dynamic run-time requirements, availability and response time. These capabilities for cognitive models are known in the art.

Each cognitive instance $101, 102, 103, 10$-$n$ shares its own cognitive capability map 101cap with the other cognitive instances in the community via communications links 120 which may be embodied as Internet links or as links within one (non-public) intranet or among multiple interoperating intranets. In a particular example, every cognitive instance $101, 102, 103, 10$-$n$ has a discovery agent (for example, embodied in software tangibly stored on a memory 101$m$) and each cognitive instance's discovery agent pulls the range of Internet protocol (IP) addresses from a centralized location or from a manually configured location arranged for this purpose.

Now having the address range that will include the IP addresses of all the cognitive instances $101, 102, 103, 10$-$n$ in the community, each cognitive instance's discovery agent sends a broadcast message such as for example a "Hello cognitive peers" message 130 to all those addresses in the range. The cognitive instance peers respond to such a broadcast "Hello" message 130 and the response has the number of communication hops it took to reach that peer. In the FIG. 1 example the size of the cognitive community is relatively small and there are communication links 120 directly between each illustrated pair of cognitive instances so the number of hops would be 1 for each peer (or zero, depending on how the hop count is defined). But in a more robust system this may not always be the case, so for example if there were no direct communication links 120 between the first cognitive instance 101 and the third cognitive instance 103 the hop count would be 2 (or 1, depending on how the hop count is defined) since communications between these two entities 101, 103 is not direct and would need to pass through either the second cognitive instance 102 or the $n^{th}$ cognitive instance 10-$n$.

The cognitive instance 101 that sends this "Hello cognitive peers" message 130 can include its own cognitive capabilities map 101cap with that broadcast message 130, or it can send its own cognitive capabilities map 101cap in reply to receiving from a peer cognitive instance $102, 103, 10$-$n$ that peer's cognitive capabilities map. Following this routine amongst all the cognitive instances $101, 102, 103, 10$-$n$ will yield a full set of cognitive capabilities maps 101cap for all the cognitive peers in the local memory of each cognitive instance $101, 102, 103, 10$-$n$ of the cognitive peer community.

New members of the cognitive community would be assigned an IP address within the range, or alternatively the range would be expanded to include the IP address of the new cognitive instance member. Each cognitive instance's discovery agent checks the address range, either periodically when routinely updating their cognitive capabilities maps 101cap and cognitive community map 101map and/or prior to sending out a new "Hello" broadcast message 130 when seeking assistance in resolving a problem currently being pondered by the cognitive instance's own cognitive computing program. In this manner the cognitive capabilities maps 101cap and cognitive community map 101map stored in the local computer readable memory 101m of each cognitive instance 101, 102, 103, 10-n is routinely refreshed. Alternatively, the cognitive capabilities maps 101cap may be stored in one location that is accessible by all the cognitive instances 101, 102, 103, 10-n and each such instance locally stores its own cognitive community map 101map, but for larger and more robust systems in which there is not direct communication links 120 between every pair of cognitive instances 101, 102, 103, 10-n (or between every cognitive instance and the one location if that one location is not one of the cognitive peers itself) this alternative may impose an unwanted delay when one cognitive instance checks to see if there is suitable assistance available in the rest of the cognitive community.

FIG. 2 is a non-limiting example of a cognitive community map 101map stored in the local memory 101m of the first cognitive instance 101. Each different row is a data structure for a specific cognitive capability 210, and the peer cognitive instances 102, 103, 10-n are listed in the different columns. The various cognitive capabilities include cognitive level 202A which is a standardized measure of the extent of intelligence in the cognitive instance; format processing capabilities 202B which allows one cognitive instance to filter out those peers that might be capable in a particular field but lack the formatting ability to contribute to solving the particular problem the one cognitive instance is seeking to resolve; credentials 202C which can also be used to filter which peer is to be sought out for extra assistance; proximity 202K which is detailed above in number of hops from the cognitive instance 101 at which this particular map 101map is stored, and expert foot print domains 202H and domain levels 202I which delineate the peers' areas of expertise and levels of that expertise, respectively. The remaining specific cognitive capabilities 202D, 202E, 202F, 202G, 202J, 202L, 202M and 202N are self-explanatory. It is evident from at least the proximity capability 202K that the map 101map of one cognitive instance 101 is not necessarily identical to the maps of other peer cognitive instances 102, 103, 10-n. As will be seen from FIG. 3, the priority 210 and weightage 220 in a given cognitive community map 101map will also be unique per cognitive instance 101, 102, 103, 10-n as well as per request of the given cognitive instance to seek assistance in resolving a given problem from the cognitive community shown by example at FIG. 1.

Embodiments of these teachings provide an algorithm that is executed by the run time engine of a given cognitive instance 101 that dynamically computes at least certain fields of that cognitive instance's cognitive community map 101map based on the cognitive capability maps 101cap of the peer cognitive instances 102,103, 10-n. The run time engine is simply a software program tangibly stored on a memory 101m and executed by the processor/controller 101con whenever a new problem to be solved is presented to the cognitive instance 101; such a new problem may be considered a user request of the cognitive instance 101. The FIG. 2 example shows certain cognitive capabilities 202 of the peers 102, 103, 10-n at columns 102, 103 and 10-n and those fields of the cognitive community map are updated periodically via the "Hello" message 130 previously discussed. While in some embodiments these cognitive capability maps 10 leap may be updated at run time and in this regard may be considered dynamically updated when this refreshed data is transferred to the cognitive community map 101map, the peer cognitive capabilities are not dynamically computed at run time whereas the dynamically updated fields, shown in FIG. 2 as the priority 210 and weight 220 columns, are dynamically computed. In this regard the cognitive community map may be considered two mutually exclusive sets of fields: a first set of fields 102, 103, 10-4 of the cognitive community map 101map mirror the cognitive capabilities 202 of the peer cognitive instances and are populated from data in the cognitive capabilities maps 101cap collected from the respective cognitive instance 102, 103, 10-n peers; whereas a mutually exclusive second set of fields 210, 220 of the cognitive community map 101map are dynamically computed based on the first set and on a given request/problem to be solved. For example, one problem may require an expert level 202A in the product domain 202H which would result in those cognitive capabilities assigned a higher weightage 220 than another problem that seeks to minimize response times 202M and cost to compute 202J due to a particularly heavy computational load.

Generally the priority 210 reflects an ordering of the various cognitive capabilities 202 relative to one another and in a specific embodiment this ordering is computed based on cost factors (or at least based on factors excluding capability) whereas the weighting 220 reflects relevance of any given cognitive capability 202 for resolving the problem/request being considered. Said another way, the weighting 220 is a measure of the likelihood that the given cognitive capability 202 will provide the most skillful response to the request. For any given instance of the cognitive community map 101map compiled by a given cognitive instance 101, the priorities 210 and the weightings 220 are computed based on the specific request being handled by that cognitive instance so as to intelligently identify which if any of the cognitive peers 102, 103, 10-n are best suited to assist in resolving/addressing that specific request, within whatever parameters (such as time to answer, minimum confidence level, etc.) may be associated with that request.

Each cognitive capability 202 of the cognitive instance peers 102, 103, 10-n is weighted 220 and is assigned with a priority 210 which will be used by the run time engine. For every user request the algorithm is executed and one or more qualifying (peer) cognitive instances is selected to serve the request as detailed by example further below with respect to FIG. 3. The algorithm is run for each new request 302, and from the nature of the request 302 the algorithm computes weightage 304 (shown at column 220 of FIG. 2) for the various cognitive capabilities that are relevant to that request 302. As noted above, the cognitive capabilities maps 101cap may be refreshed upon each request 302 which would result in the capabilities fields 202 of the cognitive community map 101map also being refreshed as block 303 notes. The self-map indicated there refers to the cognitive capabilities map 101cap of the cognitive instance 101 handling the request 302, and in this regard the request 302 may require a certain cognitive capability that is lacking in the cognitive instance 101 handling the request 302 which would influence how much that capability is weighted 220 or prioritized 210 for the peer cognitive instances 102, 103, 10-n when those are computed 304. Now with the dynamically updated cognitive community map 101map fully refreshed and updated, the cognitive instance 101 handling the request 302 can readily identify and select 306 the peer cognitive instance or instances **102, 103, 10-*n* that will best serve this particular request 302**.

Figure 3:
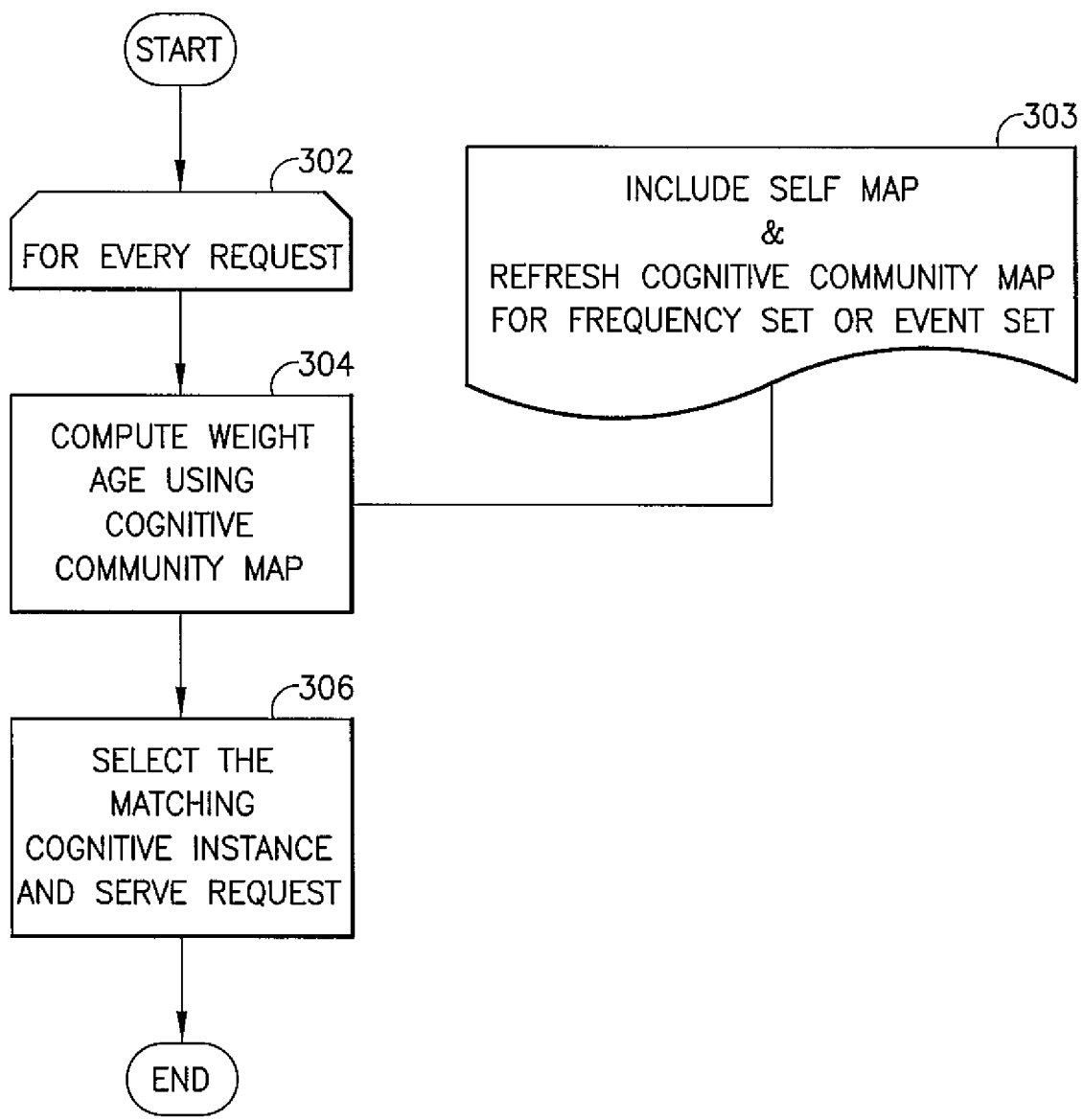
FIG. 3 is a process flow diagram for an example algorithm that is executed upon each new user request of the given cognitive instance by which the cognitive community map is compiled/completed and consulted for which, if any, cognitive peers is most suited to assist in responding to the request, according to an example embodiment of these teachings.
Figure 4:
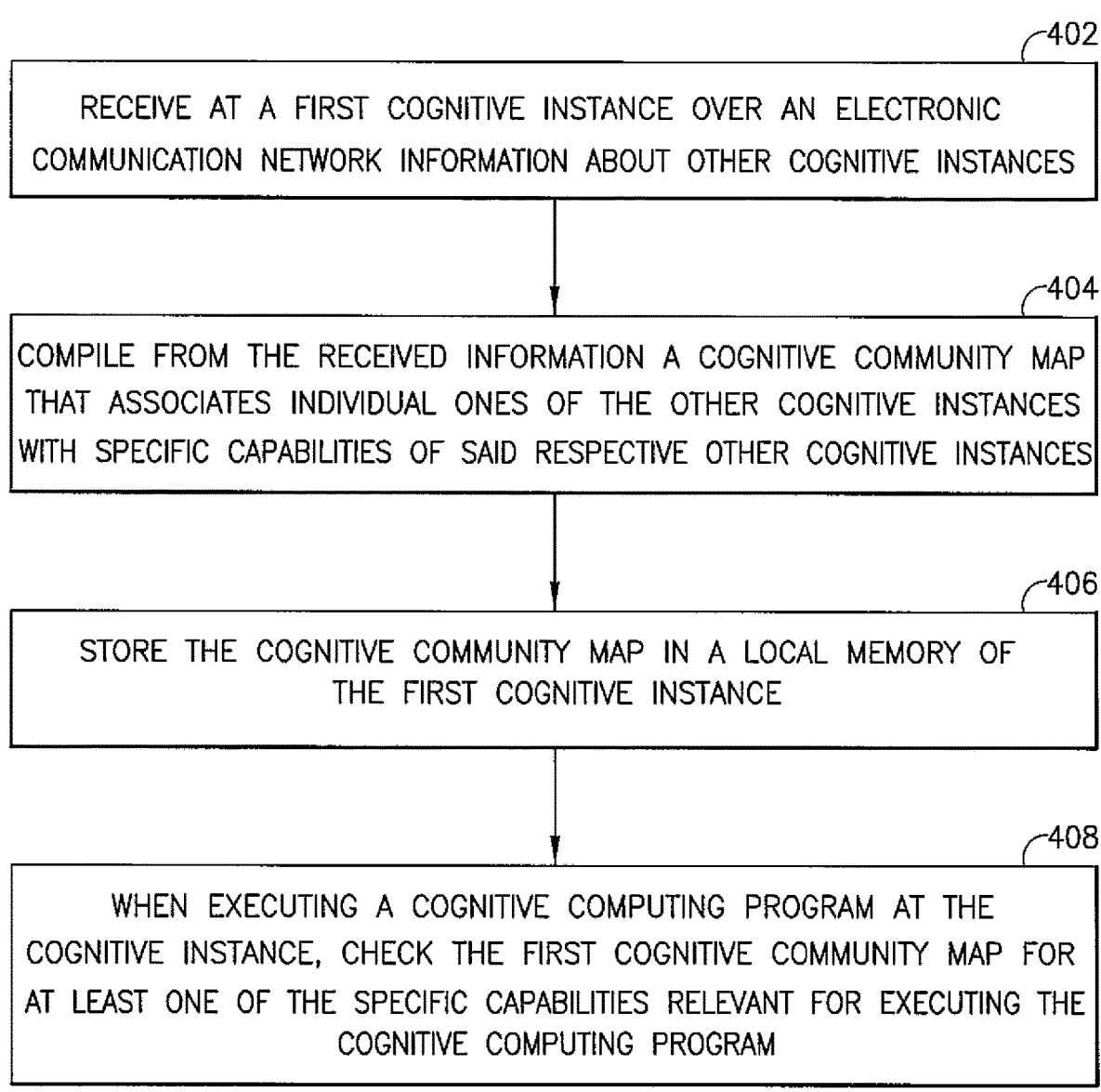
FIG. 4 is a different process flow diagram that illustrates how the cognitive community map is constructed/compiled by a given cognitive instance using the capability information of its cognitive peers, according to an example embodiment of these teachings.

FIG. 4 is a process flow diagram illustrating a broader view than FIG. 3 in that it reflects the construction of the cognitive community map 101map by a first cognitive instance 101 using the capability information of its peers **102, 103, 10-*n*. At block 402 the first cognitive instance 101 receives over an electronic communication network (formed by the links 120 in FIG. 1) information about other cognitive instances 102, 103, 10-*n*. Such information is detailed above as the cognitive capability maps 101cap of the peer cognitive instances 102, 103, 10-*n*. From this received information is compiled at block 404 a cognitive community map 101map that associates individual ones of the other cognitive instances 102, 103, 10-*n* with specific capabilities 202 of said respective other cognitive instances. Block 406 has this cognitive community map 101map stored in a local memory 101***m* of the first cognitive instance 101, which the first cognitive instance 101 checks 306 when executing a cognitive computing program (for example, in response to a new user request 302) for at least one of the specific capabilities 202 relevant for executing that program in reply to that specific request.

In the more specific non-limiting example above the compiling at block 404 includes refreshing 303 a previously-stored cognitive community map; and the receiving at block 402 is in reply to a query message 130 sent from the first cognitive instance 101 to all of the other cognitive instances **102, 103, 10-*n* that were listed on the previously-stored cognitive community map 101map. So long as all those other cognitive instances 102, 103, 10-*n*** are within the address range, broadcasting the "Hello" message to all IP addresses within that address range will comply with this particular aspect of the invention.

Further in the non-limiting aspects that are detailed more fully above, the specific capabilities 202 of at least some of the other cognitive instances **102, 103, 10-*n* includes at least wisdom facet information (such as level identifier 202A, format processing ability 202B, paraphrase distance 202C, accuracy credentials 202E, precision credentials 202F and security credentials 202G); expert footprint information 202H and 202I; cost to compute information 202J; proximity to the first cognitive instance information 202K; and run-time non-functional requirements (such as static and dynamic run-time requirements not shown in the FIG. 2 example as well as availability 202N and response time 202M**).

In a particular embodiment the algorithm of FIG. 3 is not run on every request but only when the first cognitive instance 101 deems that some peer assistance would be desirable for that specific request. The first cognitive instance 101 knows its own capabilities and can go out to the peer community if its own capabilities fall short of some threshold relevant for any given individual request 302. In this regard when the first cognitive instance 101 is executing its own cognitive computing program a query 302 from a user of the first cognitive instance 101 is identified as being beyond a confidence level of the cognitive computing program to address, in which case at block 408 the first cognitive instance 101 checks the cognitive community map 101map for at least one of the specific capabilities 202 relevant for executing the cognitive computing program by:

using pre-established cognitive community access rules and the at least one of the specific capabilities 202 relevant for executing the cognitive computing program to select a cognitive peer from among the other cognitive instances **102, 103, 10-*n*; and invoking the cognitive peer to assist in addressing the query 302**.

In another particular embodiment the first cognitive instance can 'lock' certain capabilities or aspects of a chosen cognitive peer to essentially reserve resources there to assure the capabilities it needs will be available for the request 302. Run time capabilities is one such capability, and in this regard block 408 of FIG. 4 includes selecting a cognitive peer from among the other cognitive instances **102, 103, 10-*n* based on the at least one of the specific capabilities 202 relevant for executing the cognitive computing program; sending to that cognitive peer a query about run time capabilities of the cognitive peer; and in response to determining that the run time capabilities of the cognitive peer are suitable, locking at least one aspect of the cognitive peer to assure the run time capabilities of the cognitive peer in service of the first cognitive instance 101**.

In a further particular embodiment the first cognitive instance 101 shares its own capabilities map with its cognitive peers. In this regard the first cognitive instance replies to a poll it received from one of the other cognitive instances **102, 103, 10-*n* with at least one of a) information about capabilities 220 of the first cognitive instance 101; and the cognitive capability map 101map. This describes a peer-to-peer sharing of capabilities but in another embodiment all of the capabilities maps 101cap are stored at some location that is universally-accessible by all the participating cognitive instances, which for conciseness we can term simply a cognitive capability hub entity (which may be implemented as a server different from any of the cognitive instances 101, 102, 103, 10-*n***).

The embodiments shown at FIGS. 3 and 4, and as more particularly detailed above, may represent strings or groups of computer readable code stored on a memory that is executable by one or more processors/controllers for implementing these teachings, or steps of a method, or actions that the given/first cognitive instance 101 performs in response to the computer program stored in the memory 101*m* being executed by the controller(s) 101con.

In the foregoing description, numerous specific details are set forth, such as particular structures, components, materials, dimensions, processing steps, and techniques, in order to provide a thorough understanding of the exemplary embodiments disclosed herein. However, it will be appreciated by one of ordinary skill of the art that the exemplary embodiments disclosed herein may be practiced without these specific details. Additionally, details of well-known structures or processing steps may have been omitted or may have not been described in order to avoid obscuring the presented embodiments. It will be understood that the particular order of steps or actions described herein is not necessarily restrictive, except to the extent one step is a condition precedent for accomplishing another.

The description of the present invention has been presented for purposes of illustration and description, but is not intended to be exhaustive or limiting in the form disclosed. Many modifications and variations will be apparent to those of ordinary skill in the art without departing from the scope of the invention. The embodiments were chosen and described in order to best explain the principles of the invention and the practical applications, and to enable others of ordinary skill in the art to understand the invention for various embodiments with various modifications as are suited to the particular uses contemplated.

The present invention may be implemented as a system, a method, and/or a computer program product. The computer program product may include a computer readable storage medium (or media) having computer readable program instructions stored thereon for causing a processor to carry out certain aspects of the present invention.

The computer readable storage medium such as the memory 101m can be a tangible device that can retain and store instructions for use by an instruction execution device (such as the data processor(s) 101con). The computer readable storage medium 101m may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor 101con of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium 101m that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGs illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As such, various modifications and adaptations may become apparent to those skilled in the relevant arts in view of the foregoing description, when read in conjunction with the accompanying drawings and the appended claims. As but some examples, the use of other similar or equivalent vulnerability types may be used by those skilled in the art. However, all such and similar modifications of the teachings of this invention will still fall within the scope of this invention.

What is claimed is:

1. A method comprising:
    receiving at a first cognitive instance over an electronic communication network information about other cognitive instances;
    compiling from the received information a cognitive community map that associates individual ones of the other cognitive instances with specific capabilities of said respective other cognitive instances;
    storing the cognitive community map in a local memory of the first cognitive instance;
    when executing a cognitive computing program at the first cognitive instance, checking the cognitive community map for at least one of the specific capabilities relevant for executing the cognitive computing program;
    selecting a cognitive peer from among the other cognitive instances based on the at least one of the specific capabilities relevant for executing the cognitive computing program;
    sending to the cognitive peer a query about run time capabilities of the cognitive peer; and
    in response to determining that the run time capabilities of the cognitive peer are suitable, locking at least one aspect of the cognitive peer to assure the run time capabilities of the cognitive peer in service of the first cognitive instance.

2. The method according to claim 1, wherein:
    the compiling comprises refreshing a previously-stored cognitive community map; and
    the receiving is in reply to a query message sent from the first cognitive instance to all of the other cognitive instances that were listed on the previously-stored cognitive community map.

3. The method according to claim 2, wherein the information received at the first cognitive instance comprises cognitive capability maps from the other cognitive instances.

4. The method according to claim 1, wherein the specific capabilities of at least some of the other cognitive instances includes at least:
    wisdom facet information;
    expert footprint information;
    cost to compute information;
    proximity to the first cognitive instance information; and
    run-time non-functional requirements.

5. The method according to claim 4, wherein at least one of:
    the wisdom facet information includes:
        level identifier,
        format processing ability,
        paraphrase distance,
        accuracy credentials,
        precision credentials and
        security credentials;
    or
    the run-time non-functional requirements includes:
        static run-time requirements,
        dynamic run-time requirements,
        availability and
        response time.

6. A method comprising:
    receiving at a first cognitive instance over an electronic communication network information about other cognitive instances;
    compiling from the received information a cognitive community map that associates individual ones of the other cognitive instances with specific capabilities of said respective other cognitive instances;
    storing the cognitive community map in a local memory of the first cognitive instance;
    when executing a cognitive computing program at the first cognitive instance, checking the cognitive community map for at least one of the specific capabilities relevant for executing the cognitive computing program;
    when executing the cognitive computing program at the first cognitive instance a query from a user of the first cognitive instance is identified as being beyond a confidence level of the cognitive computing program to address; and
    checking the cognitive community map for at least one of the specific capabilities relevant for executing the cognitive computing program comprises:
        using pre-established cognitive community access rules and the at least one of the specific capabilities relevant for executing the cognitive computing program to select a cognitive peer from among the other cognitive instances; and
        invoking the cognitive peer to assist in addressing the query.

7. The method according to claim 1, further comprising:
    replying to a poll, received at the first cognitive instance from one of the other cognitive instances or from a cognitive capability hub entity, with at least one of:
        information about capabilities of the first cognitive instance; or
        the cognitive capability map.

8. An apparatus comprising:
    one or more memories comprising non-transitory computer-readable code; and
    one or more processors, wherein the one or more processors are configured, in response to execution of the computer-readable code, to cause the apparatus to perform actions comprising:
receive at a first cognitive instance over an electronic communication network information about other cognitive instances;
compile from the received information a cognitive community map that associates individual ones of the other cognitive instances with specific capabilities of said respective other cognitive instances;
store the cognitive community map in a local memory of the first cognitive instance;
when executing a cognitive computing program at the first cognitive instance, check the cognitive community map for at least one of the specific capabilities relevant for executing the cognitive computing program;
reply to a poll, received at the first cognitive instance from one of the other cognitive instances or from a cognitive capability hub entity, with at least one of:
information about capabilities of the first cognitive instance; or
the cognitive capability map.

9. The apparatus according to claim 8, wherein:
the cognitive community map is compiled by refreshing a previously-stored cognitive community map; and
the information about other cognitive instances is received in reply to a query message sent from the first cognitive instance to all of the other cognitive instances that were listed on the previously-stored cognitive community map.

10. The apparatus according to claim 9, wherein the information received at the first cognitive instance comprises cognitive capability maps from the other cognitive instances.

11. The apparatus according to claim 8, wherein the specific capabilities of at least some of the other cognitive instances includes at least:
wisdom facet information;
expert footprint information;
cost to compute information;
proximity to the first cognitive instance information; and
run-time non-functional requirements.

12. The apparatus according to claim 11, wherein at least one of:

the wisdom facet information includes:
level identifier,
format processing ability,
paraphrase distance,
accuracy credentials,
precision credentials and
security credentials;
or
the run-time non-functional requirements includes:
static run-time requirements,
dynamic run-time requirements,
availability and
response time.

13. The apparatus according to claim 8, wherein:
when executing the cognitive computing program at the first cognitive instance a query from a user of the first cognitive instance is identified as being beyond a confidence level of the cognitive computing program to address; and
the cognitive community map is checked for at least one of the specific capabilities relevant for executing the cognitive computing program by:
using pre-established cognitive community access rules and the at least one of the specific capabilities relevant for executing the cognitive computing program to select a cognitive peer from among the other cognitive instances; and
invoking the cognitive peer to assist in addressing the query.

14. The apparatus according to claim 8, the actions further comprising:
select a cognitive peer from among the other cognitive instances based on the at least one of the specific capabilities relevant for executing the cognitive computing program;
send to the cognitive peer a query about run time capabilities of the cognitive peer; and
in response to determining that the run time capabilities of the cognitive peer are suitable, lock at least one aspect of the cognitive peer to assure the run time capabilities of the cognitive peer in service of the first cognitive instance.

* * * * *

UNITED STATES PATENT AND TRADEMARK OFFICE
CERTIFICATE OF CORRECTION

PATENT NO. : 10,885,445 B2
APPLICATION NO. : 15/622502
DATED : January 5, 2021
INVENTOR(S) : Lynar et al.

Page 1 of 1

It is certified that error appears in the above-identified patent and that said Letters Patent is hereby corrected as shown below:

On the Title Page

Item (72) Please delete "Slvakumar" and replace with --Sivakumar--.

Signed and Sealed this
Eighteenth Day of January, 2022

Drew Hirshfeld
*Performing the Functions and Duties of the*
*Under Secretary of Commerce for Intellectual Property and*
*Director of the United States Patent and Trademark Office*